US010789584B2

(12) United States Patent
Pandey

(10) Patent No.: US 10,789,584 B2
(45) Date of Patent: Sep. 29, 2020

(54) METHODS AND APPARATUS FOR PROCESSING A PAYMENT-ON-DELIVERY (POD) TRANSACTION

(71) Applicant: MasterCard International Incorporated, Purchase, NY (US)

(72) Inventor: AnShul Pandey, Gurgaon (IN)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 367 days.

(21) Appl. No.: 15/213,493

(22) Filed: Jul. 19, 2016

(65) Prior Publication Data

US 2017/0024732 A1  Jan. 26, 2017

(30) Foreign Application Priority Data

Jul. 24, 2015 (SG) .......................... 10201505803Q

(51) Int. Cl.
*G06Q 20/28* (2012.01)
*G06Q 20/40* (2012.01)
*G06Q 20/02* (2012.01)

(52) U.S. Cl.
CPC ............ *G06Q 20/28* (2013.01); *G06Q 20/02* (2013.01); *G06Q 20/401* (2013.01)

(58) Field of Classification Search
CPC ....... G06Q 20/28; G06Q 20/02; G06Q 20/401
(Continued)

(56) References Cited

U.S. PATENT DOCUMENTS 4,926,325 A * 5/1990 Benton .................. G06Q 20/04
340/5.74

6,085,168 A 7/2000 Mori et al.
(Continued)

FOREIGN PATENT DOCUMENTS

EP     1 296 257 A1    3/2003
JP     2001167163 A    6/2001
(Continued)

OTHER PUBLICATIONS

International Search Report and Written Opinion issued by the International Search Authority dated Oct. 25, 2016 in corresponding PCT Application No. PCT/US2016/042751 (10 pages).

*Primary Examiner* — Robert R Niquette
(74) *Attorney, Agent, or Firm* — Buchanan Ingersoll & Rooney PC

(57) ABSTRACT

A computer-implemented method for processing a payment-on-delivery (POD) transaction is provided. The method comprising (a) obtaining transaction information in respect of an order placed by a cardholder with a merchant, said transaction information comprising payment account information associated with the cardholder; (b) transmitting a pre-payment authorization code associated with the order to the cardholder; (c) receiving a payment authorization request from a communication device of the cardholder, said payment authorization request having been sent upon delivery of order merchandise, wherein the payment authorization request comprises a candidate pre-payment authorization code; (d) verifying the candidate pre-payment authorization code using the pre-payment authorization code; and (e) upon successful verification, transmitting a transaction request for effecting a payment from an issuing bank associated with the payment account, the transaction request comprising the payment account information. An apparatus is also proposed.

24 Claims, 5 Drawing Sheets

(58) Field of Classification Search
USPC .................................................. 705/35–45
See application file for complete search history.

(56) References Cited

U.S. PATENT DOCUMENTS

| | | | |
|---|---|---|---|
| 7,249,069 B2 | 7/2007 | Alie et al. | |
| 7,428,502 B2 | 9/2008 | Horton | |
| 7,783,524 B2 | 8/2010 | Horton | |
| 8,005,754 B2 | 8/2011 | McCoy et al. | |
| 8,234,176 B2 | 7/2012 | Scipioni | |
| 2003/0069842 A1* | 4/2003 | Kight | G06Q 20/10 705/39 |
| 2006/0004658 A1* | 1/2006 | Chau | G06Q 10/08 705/40 |
| 2007/0250392 A1 | 10/2007 | Paulsen et al. | |
| 2009/0299903 A1* | 12/2009 | Hung | G06Q 20/40 705/44 |
| 2011/0071914 A1* | 3/2011 | Beasley | G06Q 20/202 705/21 |
| 2015/0170142 A1* | 6/2015 | Sun | G06Q 20/08 705/44 |

FOREIGN PATENT DOCUMENTS

| | | |
|---|---|---|
| JP | 200274219 A | 3/2002 |
| JP | 200283229 A | 3/2002 |
| JP | 2002279225 A | 9/2002 |
| JP | 200421629 A | 1/2004 |
| JP | 2005284907 A | 10/2005 |
| WO | 2009087916 A1 | 7/2009 |

* cited by examiner

METHODS AND APPARATUS FOR PROCESSING A PAYMENT-ON-DELIVERY (POD) TRANSACTION

TECHNICAL FIELD AND BACKGROUND

The present disclosure relates to a method and system for processing a payment-on-delivery (POD) transaction. In particular, it provides a method and system for processing a POD transaction involving a payment using a cashless payment device.

A payment-on-delivery (POD) transaction is a type of transaction in which payment for an order of a good or service is made at the time of delivery. POD transactions are especially popular for purchases carried out in a context of a remote transaction such as via mail order, fax or the internet. Upon delivery of the goods or services in good order, the courier collects cash from the buyer on behalf of the seller to complete the transaction and the courier releases control of the goods to the buyer. However, it is inconvenient to carry out the transactions in cash, especially when the payment amount is substantial; for example, there may be security and safety concerns for the courier to handle the cash.

In some cases, a payment by a credit card may be accepted for POD transactions. The courier carries a portable point-of-sales (POS) terminal along with him and swipes the credit card to process the payment upon delivery. However, this mandates the courier to carry the POS terminal in additional to the goods to be delivered, which is cumbersome. Moreover, such POS terminals can be costly.

Therefore, it is desirable to provide an improved method and apparatus for processing a POD transaction.

SUMMARY

In general terms, the present disclosure proposes a method and apparatus for processing a POD transaction carried out using a payment card in a more convenient yet secure way. In particular, the method proposes using a server (such as a third party server) to withhold a payment transaction from being processed (e.g. by withholding the payment account information of the cardholder) until the cardholder confirms that an order (i.e. the ordered merchandise) is received in good condition thereby authorizing the transaction to be effected.

According to a first expression, there is provided a computer-implemented method for processing a payment-on-delivery (POD) transaction. The method comprises:

(a) obtaining, by a transaction management component of a server, transaction information in respect of an order placed by a cardholder with a merchant, said transaction information comprising payment account information associated with the cardholder;

(b) transmitting, by the transaction management component, a pre-payment authorization code associated with the order to the cardholder;

(c) receiving, by a payment authorization component of the server, a payment authorization request from a communication device of the cardholder, said payment authorization request having been sent upon delivery of ordered merchandise, wherein the payment authorization request comprises a candidate pre-payment authorization code;

(d) verifying, by the payment authorization component, the candidate pre-payment authorization code using the pre-payment authorization code; and (e) upon successful verification, transmitting a transaction request for effecting a payment from an issuing bank associated with the payment account, the transaction request comprising the payment account information.

This method may be implemented by, for example, a server having a computer processor and data storage device storing software components or instructions to carry out the operations disclosed above.

Advantageously, the above method allows a POD transaction to be carried out by a payment card without requiring a POS terminal. Instead, it allows the payment account information such as payment card details to be withheld by a third party (i.e. the server, which is not controlled by the cardholder or the merchant) before ordered merchandise is delivered, and the payment is not processed until the third party receives an authorization from the cardholder. The authorization can be simply made by the cardholder sending the pre-payment authorization code to the server which the cardholder received from the server upon placing the order. Note that it does not require a payment transaction between the cardholder and the third party when the cardholder places the order. In other words, no payment in any form is required from the cardholder until the ordered goods and/or services have been delivered.

The method may further comprise receiving, by a transaction notification component, a notification representing an outcome of the transaction request from at least one of the following: (i) the merchant, (ii) the acquiring bank, and (iii) the issuing bank. The server may send a confirmation message, upon the payment being approved, to cause control of the ordered merchandise to be relinquished to the cardholder. In one example, the confirmation message is sent to a delivery service provider associated with the delivery of the ordered merchandise, such as a courier. In another example, the confirmation message is sent to the merchant, who in turn sends a message to the delivery service provider.

The method may comprise obtaining the payment account information from a payment system at which the cardholder has previously registered. The payment system typically stores the payment account information associated with the cardholder. This allows the payment account information to be obtained without requiring the user to input all the information, such as the card details, manually. For example, a cardholder may cause the payment account information to be obtained from his or her MasterPass™ data.

In some embodiments, prior to operation (a), the cardholder is registered with the server. The server may receive cardholder registration information comprising at least one of (i) identity data of the cardholder, (ii) the associated payment account information, and (iii) a mobile number of a mobile phone associated with the cardholder.

The method may further comprise registering the merchant with the server. The server may receive merchant registration information comprising at least one of (i) identity data of the merchant, (ii) an acquiring bank of the merchant, and (iii) a terminal device of the merchant for communication with the server.

The method may comprise transmitting the pre-payment authorization code to the communication device of the cardholder. In one example, the communication device is a mobile phone associated with the cardholder. The mobile phone may be a smartphone, i.e. a phone with advanced computing capabilities and connectivity, in addition to what is provided by a feature phone, i.e. a phone with only basic features such as making or receiving calls, and sending or receiving text messages.

In some embodiments, the pre-payment authorization code is encrypted. In one example, the pre-payment authorization code itself is a cryptogram. Additionally or alternatively, the transmission of the code is via an encrypted pipe (such as the VPN).

The method may further comprise transmitting the candidate pre-payment authorization code via a protocol selected from one of: (i) Short Message Service (SMS), (ii) Unstructured Supplementary Service Data (USSD) and (iii) a software application installed on the communication device of the cardholder.

In some embodiments, the candidate pre-payment authorization code is encrypted. In one example, the candidate pre-payment authorization code itself is a cryptogram. Additionally or alternatively, the transmission of the code is via an encrypted pipe (such as the VPN).

The transaction information may further comprise a transaction amount of the order.

According to a second expression, there is provided an apparatus for processing a payment-on-delivery (POD) transaction. The apparatus comprises a computer processor and a data storage device. The data storage device has a transaction management component and a payment authorization component comprising non-transitory instructions operative by the processor to perform a method disclosed above.

According to a third expression, there is provided a non-transitory computer-readable medium. The computer-readable medium has stored thereon program instructions for causing at least one processor to perform operations of a method disclosed above.

According to another expression, there is provided another computer-implemented method for processing a payment-on-delivery (POD) transaction. The method comprises:
(a) receiving, by an order processing component, an order from a cardholder;
(b) receiving, by the order processing component, a notification from a payment management system confirming an availability of payment account information associated with the cardholder in respect of the order;
(c) processing, by the order processing component, the order to arrange for delivery of ordered merchandise to the cardholder;
(d) receiving, by a payment processing component, the payment account information from the payment management system upon the ordered merchandise having been delivered to the cardholder; and
(e) causing an acquiring bank of the merchant to effect a payment from an issuing bank associated with the payment account using the payment account information.

This method may be implemented by a server or any other terminal of the merchant.

The method may further comprise sending a confirmation message, upon the payment being approved, to cause control of the ordered merchandise to be relinquished to the cardholder. In one example, the confirmation message is sent to a delivery service provider associated with the delivery of the ordered merchandise. The confirmation message may additionally or alternatively be sent to the payment management system. The payment management system may be a system described above with respect to the first expression.

According to a further expression, there is provided an apparatus for processing a payment-on-delivery (POD) transaction. The apparatus comprises a computer processor and a data storage device, the data storage device having an order management component and a payment processing component comprising non-transitory instructions operative by the processor to perform a method disclosed above.

According to a yet further expression, there is provided a non-transitory computer-readable medium. The computer-readable medium has stored thereon program instructions for causing at least one processor to perform operations of a method disclosed above.

The term "payment card" referred to in this document may include but is not limited to a physical (e.g. plastic) card. Rather, the term refers to a bank account such as a credit card, a debit card, loan, checking, and/or savings account, having a primary account number (PAN) maintained by a bank ("the card issuing bank"). The PAN functions as payment credentials used when making a payment. Conventionally, the PAN is a 16-digit PAN number, which, if a physical card exists, is printed on the card. However, a payment card can be used in the present invention irrespective of whether a physical card bearing the payment credentials exists. Non exhaustive examples of payment cards include a credit card, a debit card, a prepaid card, a charge card, a membership card, a promotional card, a frequent flyer card, an identification card, a prepaid card, a gift card. A payment card may also be embodied in another device that may hold payment card information (including bank account information associated with the card such as the PAN, or a token representing the PAN which serves as a pointer to the actual PAN), such as mobile phones, smartphones, personal digital assistants (PDAs), key fobs, transponder devices, NFC-enabled devices, and/or computers.

Accordingly, the term "payment account information" represents bank accounts information associated with a payment card, such as a primary account number (PAN) of a credit card holder.

The term "communication device" refers a piece of equipment or hardware which is capable of transmitting and receiving data electronically. It may be a computer device such as a mobile phone (e.g. smartphones or conventional/feature phones), a tablet, a desktop computer, a laptop computer or a smart watch etc.

BRIEF DESCRIPTION OF THE DRAWINGS

Embodiments of the invention will now be described for the sake of non-limiting example only, with reference to the following drawings in which.

DETAILED DESCRIPTION

Figure 1:
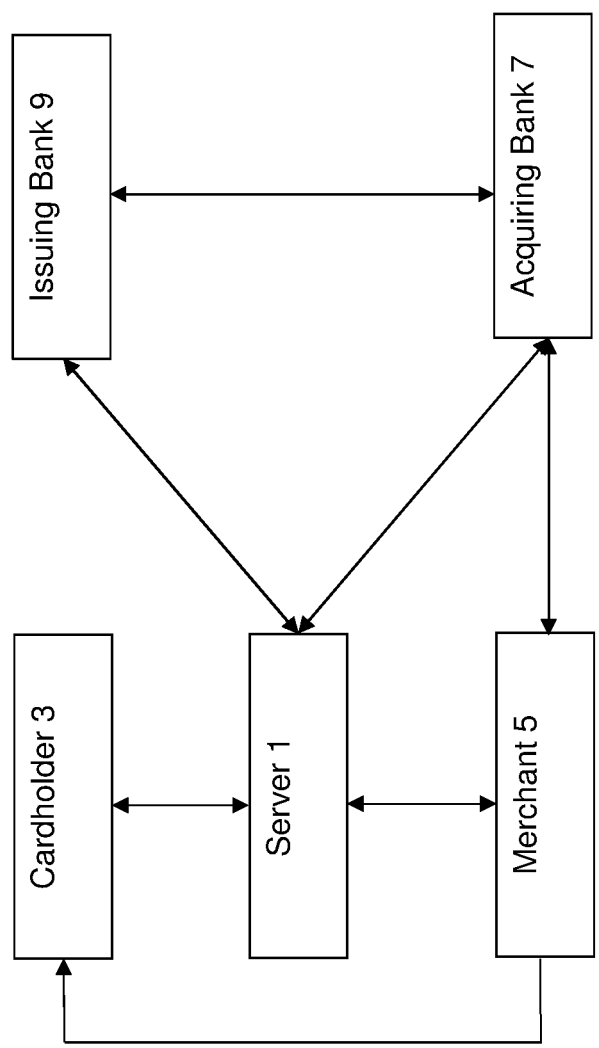
FIG. 1 illustrates an apparatus according to an embodiment.

FIG. 1 illustrates an apparatus 1 for processing a payment-on-delivery (POD) transaction between a cardholder 3 and a merchant 5, for example, in respect of a remote purchase, such as for goods and servers that are ordered via phone, mail order, fax or the Internet.

A server 1 is provided to communicate with the cardholder 3 and the merchant 5. Optionally, as described below, the server 1 may be also in communication with an issuing bank 9 of the cardholder 3 and an acquiring bank 7 of the merchant 5. Generally, the server 1 may be configured to handle requests and/or communications from terminals associated with parties involved in a transaction carried out over a payment network. The payment network can be any electronic payment network which connects, directly and/or indirectly payers (consumers and/or their banks or similar financial institutions) with payees (the merchants and/or their banks or similar financial institutions). Non-limiting examples of the payment network are a payment card type of network such as the payment processing network operated by MasterCard, Inc. The various communication may take place via any types of network, for example, virtual private network (VPN), the Internet, a local area and/or wide area network (LAN and/or WAN), and so on.

Figure 2:
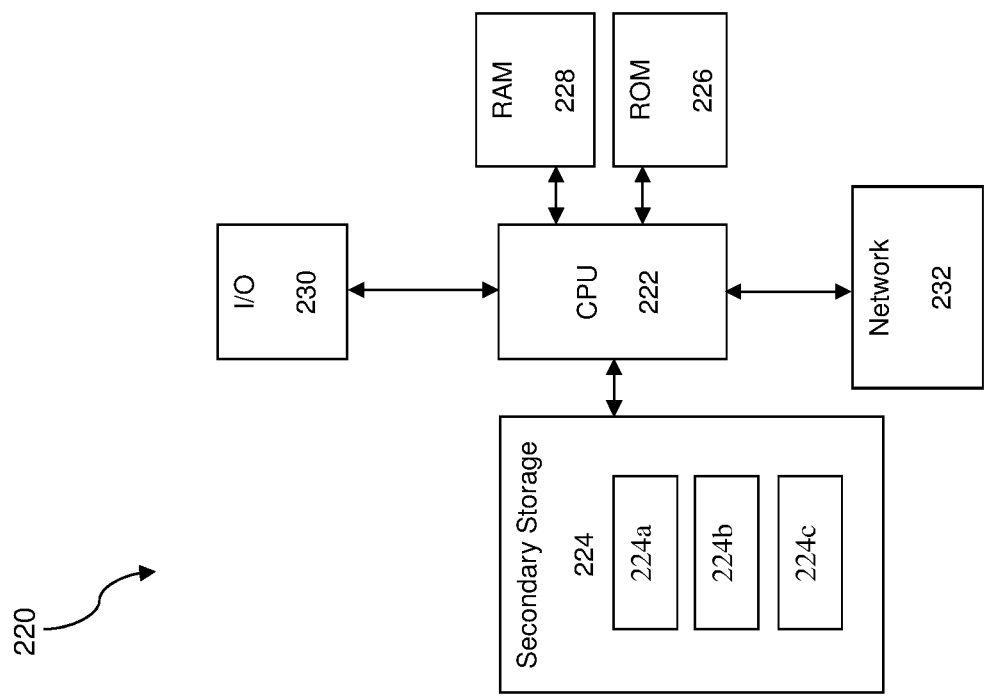
FIG. 2 is a block diagram illustrating a technical architecture of the apparatus according to an embodiment.
Figure 3:
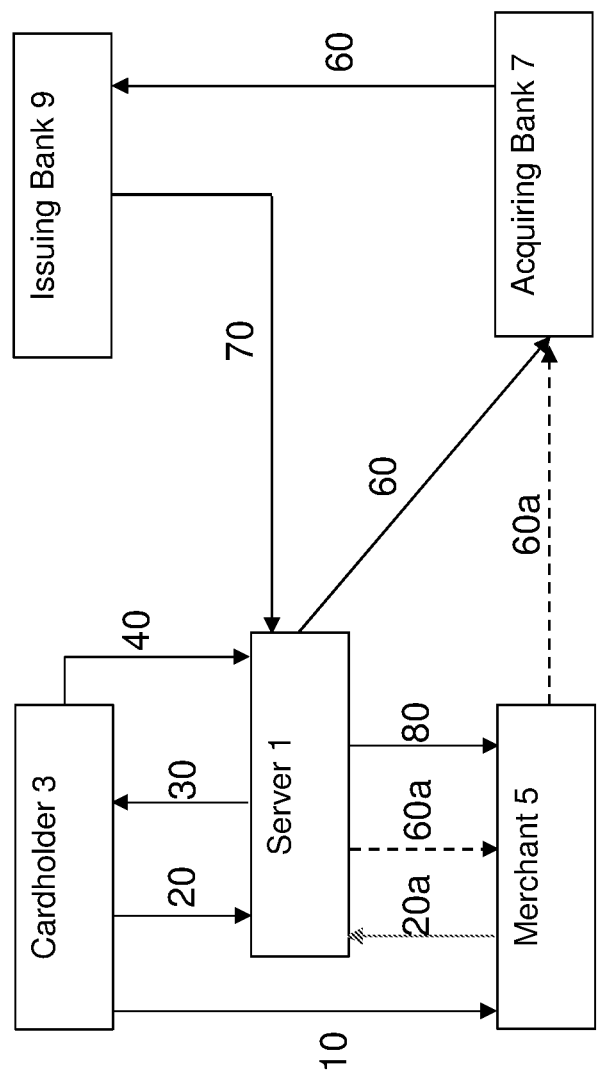
FIG. 3 illustrates process steps which are performed by the system of FIG. 1 during a POD transaction.
Figure 4:
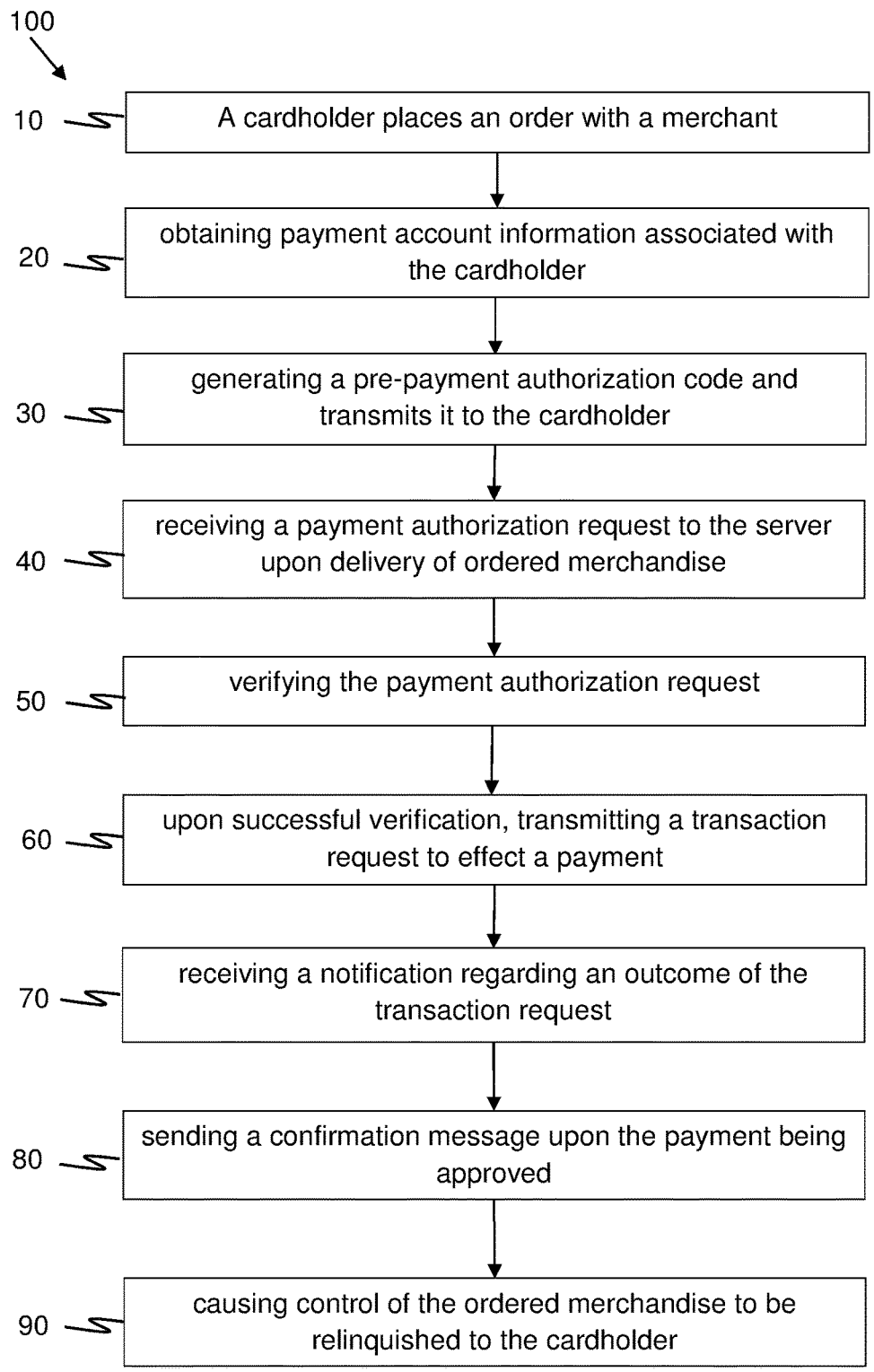
FIG. 4 is a flow diagram of operations according to an embodiment.

FIG. 2 is a block diagram showing a technical architecture of the server 1 for performing an exemplary method 100 which is described below with reference to FIGS. 3 and 4. Typically, the method 100 is implemented by a computer having a data-processing unit. The block diagram as shown FIG. 2 illustrates a technical architecture 220 of a computer which is suitable for implementing one or more embodiments herein.

The technical architecture 220 includes a processor 222 (which may be referred to as a central processor unit or CPU) that is in communication with memory devices including secondary storage 224 (such as disk drives), read only memory (ROM) 226, random access memory (RAM) 228. The processor 222 may be implemented as one or more CPU chips. The technical architecture 220 may further comprise input/output (I/O) devices 230, and network connectivity devices 232.

The secondary storage 224 is typically comprised of one or more disk drives or tape drives and is used for non-volatile storage of data and as an over-flow data storage device if RAM 228 is not large enough to hold all working data. Secondary storage 224 may be used to store programs which are loaded into RAM 228 when such programs are selected for execution. In this embodiment, the secondary storage 224 has a transaction management component 224a, a payment authorization component 224b and a transaction notification component 224c comprising non-transitory instructions operative by the processor 222 to perform various operations of the method of the present disclosure. The ROM 226 is used to store instructions and perhaps data which are read during program execution. The secondary storage 224, the RAM 228, and/or the ROM 226 may be referred to in some contexts as computer readable storage media and/or non-transitory computer readable media.

I/O devices 230 may include printers, video monitors, liquid crystal displays (LCDs), plasma displays, touch screen displays, keyboards, keypads, switches, dials, mice, track balls, voice recognizers, card readers, paper tape readers, or other well-known input devices.

The network connectivity devices 232 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards that promote radio communications using protocols such as code division multiple access (CDMA), global system for mobile communications (GSM), long-term evolution (LTE), world-wide interoperability for microwave access (WiMAX), near field communications (NFC), radio frequency identity (RFID), and/or other air interface protocol radio transceiver cards, and other well-known network devices. These network connectivity devices 232 may enable the processor 222 to communicate with the Internet or one or more intranets. With such a network connection, it is contemplated that the processor 222 might receive information from the network, or might output information to the network in the course of performing the above-described method operations. Such information, which is often represented as a sequence of instructions to be executed using processor 222, may be received from and outputted to the network, for example, in the form of a computer data signal embodied in a carrier wave.

The processor 222 executes instructions, codes, computer programs, scripts which it accesses from hard disk, floppy disk, optical disk (these various disk based systems may all be considered secondary storage 224), flash drive, ROM 226, RAM 228, or the network connectivity devices 232. While only one processor 222 is shown, multiple processors may be present. Thus, while instructions may be discussed as executed by a processor, the instructions may be executed simultaneously, serially, or otherwise executed by one or multiple processors.

Although the technical architecture 220 is described with reference to a computer, it should be appreciated that the technical architecture may be formed by two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the technical architecture 220 to provide the functionality of a number of servers that is not directly bound to the number of computers in the technical architecture 220. In an embodiment, the functionality disclosed above may be provided by executing the application and/or applications in a cloud computing environment. Cloud computing may comprise providing computing services via a network connection using dynamically scalable computing resources. A cloud computing environment may be established by an enterprise and/or may be hired on an as-needed basis from a third party provider.

It is understood that by programming and/or loading executable instructions onto the technical architecture 220, at least one of the CPU 222, the RAM 228, and the ROM 226 are changed, transforming the technical architecture 220 in part into a specific purpose machine or apparatus having the novel functionality taught by the present disclosure. It is fundamental to the electrical engineering and software engineering arts that functionality that can be implemented by loading executable software into a computer can be converted to a hardware implementation by well-known design rules.

Various operations of the exemplary method 100 will now be described with reference to FIGS. 3 and 4 in respect of a transaction carried out between a cardholder and a merchant. It will be understood that the method 100 can accommodate multiple cardholders and merchants. It should be noted that enumeration of operations is for purposes of clarity and that the operations need not be performed in the order implied by the enumeration.

At step 10, a cardholder places an order with a merchant. The order may be placed via the Internet, phone, fax, mail or any other remote means. For example, the cardholder 3 uses his or her computer device to make an order of merchandise online via a website of the merchant 5. Note that the ordered merchandise may be goods and/or services. In case of the ordered merchandise is a service, the merchant could be a service provider. In one example, the merchant may be a barber shop, and the service delivered is hair dressing of a customer in the home of the customer. In another example, a plumber may go to a house to deliver plumbing services.

At step 20, the transaction management component 224a of the server 1 obtains transaction information in respect of the order. For example, when the order is made, the cardholder may be prompted to use a system of the present disclosure to complete the order. In particular, the cardholder 3 may input payment account information which he or she intends to use for paying the merchant 5 upon receipt of the ordered merchandise. The transaction information may further include the transaction amount of the order, which may be provided by the merchant 5 to the server 1 at step 20a. The transaction information may be saved on a database (not shown) which is accessible by the CPU 222. The database may be stored on the secondary storage device 224 of the server 1 itself or any other data storage medium. The database may further store payment account information for one or more payment cards associated with the cardholder 3.

At step 30, the payment authorization component 224b of the server 1 generates a pre-payment authorization code associated with the order, and transmits the code to a communication device of the cardholder 3, for example, to a mobile phone or a tablet computer of the cardholder 3. The pre-payment authorization code is used for authorizing a payment to the merchant 5 in the subsequent operations, as will be described in detail later. In some embodiments, the pre-payment authorization code may be generated by a specialized security system in communication with the server 1. The pre-payment authorization code is typically encrypted during transmission for security purposes.

Upon the cardholder receiving the ordered goods and/or services in good order, a payment authorization request is transmitted to the server 1 from a cardholder's communication device at step 40 to authorize a payment to be processed. The payment authorization request comprises information associated with the pre-payment authorization code received from the server 1 at step 30. This communication device may be the same or different from the device which receives the pre-payment authorization code from the server 1. For example, the pre-payment authorization code could be received via a laptop of the cardholder 3 while the payment authorization request is sent via a mobile phone of the cardholder 3. The payment authorization request may be encrypted before transmission.

The pre-payment authorization code may be sent by the communication device via a protocol selected from one of: (i) Short Message Service (SMS), (ii) Unstructured Supplementary Service Data (USSD) and (iii) a software application installed on the communication device of the cardholder. The use of USSD allows a cardholder who uses a feature phone (as compared to a smartphone) to communicate with the server 1.

In one example, the cardholder sends the encrypted pre-payment authorization code he previously received to the server 1 by sending the code as the text of an SMS. However, it will be understood that the encrypted pre-payment authorization code could simply be a "reference number" contained in an SMS or other messages sent from the server, such that merely replying to the SMS or other messages performs the present method (i.e. without consciously sending the code as the text of the SMS or other messages to the server 1).

At step 50, the server 1 performs a verification of the payment authorization request using the pre-payment authorization code, before causing the transaction request to be processed at the issuing bank 9. The verification may further include an operation of verifying an identity of the communication device. For example, the server 1 may determine if the communication device from which it receives the payment authorization request is consistent with the one to which the pre-payment authorization code was sent. For example, whether both devices were previously registered with the server 1 or otherwise determined to be associated with the same user. In one particular example, the server 1 may verify if the pre-payment authorization code was sent to a mobile phone number which is the same as the one from which the server 1 receives the payment authorization request. The method may allow a payment authorization request, which is sent from a communication device/a mobile number that is different from the one to which the pre-payment authorization code was sent, to be successfully verified by the server 1.

At step 60, the server 1 causes a transaction request to be transmitted to effect the payment upon the verification being successful. For example, the server 1 may send the payment account information to the merchant 5 for its acquiring bank 7 to prepare and submit a payment request to the relevant issuing bank 9.

At step 70, the transaction notification component 224c of the server 1 receives a notification regarding an outcome of the transaction request. Although this example illustrates that the notification is sent to the server 1 from the issuing bank 9, it will understood that the notification may be received from the acquiring bank 7.

At step 80, the server 1 transmits a confirmation message to the merchant 5 upon the transaction be approved. In one example, the merchant 5 notifies the courier to release the ordered goods and/or services to the cardholder 3. It will be understood that the confirmation message may be sent by the server 1 directly to the courier. In another example, the confirmation message may be sent to the cardholder 3 who then requests the courier to release the ordered goods and/or services to complete the transaction at step 90.

In some embodiments, before initiating a POD transaction, the method 100 further includes a registration phase for the cardholder 3 and/or the merchant 5. The cardholder 3 may provide registration information to the server 1, which may include his/her identity data, the associated payment account information, and/or a mobile number of his/her mobile phone. Similarly, the merchant 5 may register with the server 1 by providing registration information such as identity data of the merchant, its acquiring bank and/or a terminal device (such as a mobile phone) of the merchant 5 for communication with the server 1. The information may be stored and made accessible to the server 1.

As noted above, the server 1 may be able to communicate with the acquiring bank 7 and/or the issuing bank 9. In such embodiments, upon the verification being successful, the server 1 may communicate directly with the acquiring bank 7 (step 60a of FIG. 3) to effect the payment, instead of sending the payment account information for processing via the merchant 5. Alternatively, the server may be arranged to communicate directly with the issuing bank 9 and receives the notification regarding the outcome of the transaction directly from the issuing bank 9.

In some embodiments, the outcome of the transaction request is sent to the merchant 5, for example, from its acquiring bank 7. The merchant 5 may then notify the delivery service provider to release the ordered merchandise to the cardholder 3 without reverting back to the server 1, as will be described later with respect to a method 200.

Figure 5:
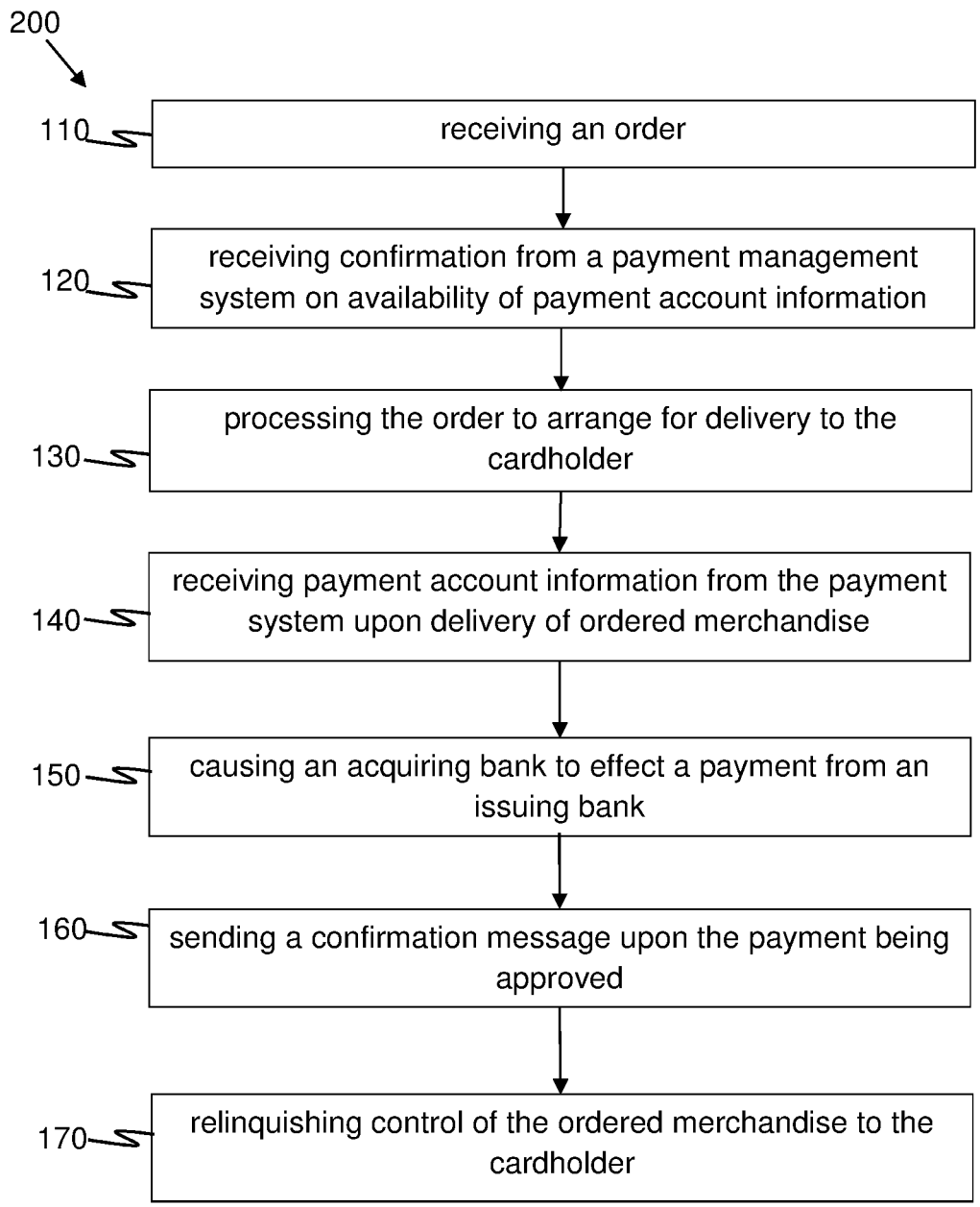
FIG. 5 is a flow diagram of operations according to another embodiment.

FIG. 5 illustrates a method 200 carried out by a server of the merchant 5 in accordance with one embodiment. Similarly, the method 200 is typically implemented by a computer having a processing unit, for example, whose architecture is similar to the architecture 220 of the server 1.

At step 110, an order processing component of the merchant's server receives an order from a cardholder, for example, in respect of a remote purchase.

At step 120, the order processing component of the merchant server receives a notification from a third-party payment management system confirming an availability of payment account information associated with the cardholder in respect of the order, before processing the order at step 130. For example, the merchant arranges for delivery of order only if the payment management system confirm that the cardholder has provided relevant payment information. In one example, the payment management system may further confirm to the merchant if the payment information is valid, before the merchant arranging for shipping of the order. The payment management system is, for example, the server 1 which carries out the operations (in part or all) of the method 100 described above.

At step 130, the merchant processes the order to arrange for delivery to the cardholder. The merchant may engage an external delivery service provider or arrange the delivery to be made by an employee of the merchant itself.

Upon the ordered merchandise being delivered to the cardholder, payment account information of the cardholder is received by the merchant from the third-party payment management system upon the cardholder's authorization at step 140.

At step 150, the merchant forwards the payment account information together with other transaction detail such as the transaction amount to cause the payment to be effected at the issuing bank. Upon a confirmation message (e.g. "transaction approved") being received at the merchant, the merchant notifies the delivery service provider to release the ordered merchandise to the cardholder to complete the POD transaction at step 160. In a variant, the merchant may notify the delivery service provider by sending a notification to the payment management system regarding a successful outcome of transaction, which then requests the delivery service provider to release the ordered merchandise to the cardholder.

Whilst the foregoing description has described exemplary embodiments, it will be understood by those skilled in the art that many variations of the embodiment can be made within the scope and spirit of the present invention. For example, the method 100 may be operated by acquiring banks or issuing banks, in this case, the server may be arranged to process the transaction request straightaway and/or notify the delivery service provider to release the ordered merchandise, without reverting to the merchant.

The invention claimed is:

1. A computer-implemented method for processing a payment-on-delivery (POD) transaction, the method comprising:
   (a) obtaining, over a payment network by a transaction management component of a server, transaction information in respect of an order placed by a cardholder with a merchant, said transaction information comprising payment account information associated with the cardholder;
   (b) transmitting, over a private communication network by the transaction management component, a pre-payment authorization code associated with the order to a first communication device of the cardholder, the pre-payment authorization code authorizing a delay in completion of the POD transaction until delivery of the ordered merchandise;
   (c) receiving, over the private communication network by a payment authorization component of the server, a payment authorization request from a second communication device of the cardholder, said payment authorization request having been sent upon electronic confirmation of delivery of the ordered merchandise, wherein the payment authorization request comprises a candidate pre-payment authorization code;
   (d) verifying, by the payment authorization component, whether the second communication device is associated with the cardholder and whether the candidate pre-payment authorization code is associated with the pre-payment authorization code;
   (e) upon successful verification, transmitting a transaction request, over the payment network, to a computing device of an issuing bank associated with a payment account associated with the cardholder to effect for effecting electronic payment of funds for the ordered merchandise from an issuing bank associated with the payment account to a computing device associated with an account of a merchant selling the ordered merchandise, the transaction request comprising the payment account information; and
   (f) upon the payment being approved receiving approval of the transaction request from the computing device of the issuing bank over the payment network, sending, over a second communication network, a confirmation message by the transaction notification component to a mobile computing device of a delivery agent, thereby causing control of the ordered merchandise to be relinquished to the cardholder.

2. A computer-implemented method according to claim 1 further comprising receiving, by a transaction notification component, a notification representing an outcome of the transaction request from at least one of (i) the merchant, (ii) the acquiring bank, and (iii) the issuing bank.

3. A computer-implemented method according to claim 1 further comprising sending the confirmation message to at least one of (i) the merchant, (ii) the cardholder and (iii) a delivery service provider associated with the delivery of the ordered merchandise.

4. A computer-implemented method according to claim 1 further comprising obtaining the payment account information from a payment system at which the cardholder has previously registered, said payment system storing the payment account information associated with the cardholder.

5. A computer-implemented method according to claim 1 further comprising, prior to operation (a), registering the cardholder with the server, in which the server receives cardholder registration information comprising at least one of (i) identity data of the cardholder, (ii) the associated payment account information, and (iii) a mobile number of a mobile phone associated with the cardholder.

6. A computer-implemented method according to claim 1 further comprising registering the merchant with the server, in which the server receives merchant registration information comprising at least one of (i) identity data of the merchant, (ii) an acquiring bank of the merchant, and (iii) a device of the merchant for communication with the server.

7. A computer-implemented method according to claim 1 in which the pre-payment authorization code is encrypted.

8. A computer-implemented method according to claim 1 in which the communication device is a mobile phone of the cardholder.

9. A computer-implemented method according to claim 1 in which the candidate pre-payment authorization code is encrypted.

10. A computer-implemented method according to claim 1 further comprising transmitting the candidate pre-payment authorization code via a protocol selected from one of: (i) Short Message Service (SMS), (ii) Unstructured Supplementary Service Data (USSD) and (iii) a software application installed on the communication device of the cardholder.

11. A computer-implemented method according to claim 1, wherein the transaction information further comprising a transaction amount of the order.

12. An apparatus for processing a payment-on-delivery (POD) transaction comprising:
    a computer processor and a data storage device, the data storage device having a transaction management component and a payment authorization component comprising non-transitory instructions operative by the processor to:
    (a) obtain transaction information, over a payment network, in respect of an order placed by a cardholder with a merchant, said transaction information comprising payment account information associated with the cardholder;
    (b) transmit, over a private communication network, a pre-payment authorization code associated with the order to a first communication device of the cardholder, the pre-payment authorization code authorizing a delay in completion of the POD transaction until delivery of the ordered merchandise;
    (c) receive, over the private communication network, a payment authorization request from a second communication device of the cardholder, said payment authorization request having been sent upon delivery of ordered merchandise, wherein the payment authorization request comprises a candidate pre-payment authorization code;
    (d) verify whether the second communication device is associated with the cardholder and whether the candidate pre-payment authorization code is associated with the pre-payment authorization code;
    (e) upon successful verification, transmit a transaction request, over the payment network, to a computing device of an issuing bank associated with a payment account associated with the cardholder to effect electronic payment of funds for the ordered merchandise from the payment account to a computing device associated with an account of a merchant selling the ordered merchandise, the transaction request comprising the payment account information; and
    (f) upon receiving approval of the transaction request from the computing device of the issuing bank over the payment network, send, over a second communication network, a confirmation message to a mobile computing device of a delivery agent, causing control of the ordered merchandise to be relinquished to the cardholder.

13. An apparatus according to claim 12, wherein the data storage device further comprises a transaction notification component having non-transitory instructions operative by the processor to receive a notification representing an outcome of the transaction request from at least one of (i) the merchant, (ii) the acquiring bank, and (iii) the issuing bank.

14. An apparatus according to claim 12, wherein the transaction notification component further comprises non-transitory instructions operative by the processor to send the confirmation message.

15. An apparatus according to claim 14, wherein the transaction notification component further comprises non-transitory instructions operative by the processor to send the confirmation message to at least one of (i) the merchant, (ii) the cardholder and (iii) a delivery service provider associated with the delivery of the ordered merchandise.

16. An apparatus according to claim 12, wherein the data storage device further comprises non-transitory instructions operative by the processor to obtain the payment account information from a payment system at which the cardholder has previously registered, said payment system storing the payment account information associated with the cardholder.

17. An apparatus according to claim 12, wherein the data storage device further comprises non-transitory instructions operative by the processor to, prior to operation (a), register the cardholder with the server, in which the server receives cardholder registration information comprising at least one of (i) identity data of the cardholder, (ii) the associated payment account information, and (iii) a mobile number of a mobile phone associated with the cardholder.

18. An apparatus according to claim 12, wherein the data storage device further comprises non-transitory instructions operative by the processor to register the merchant with the server, in which the server receives merchant registration information comprising at least one of (i) identity data of the merchant, (ii) an acquiring bank of the merchant, and (iii) a terminal device of the merchant for communication with the server.

19. An apparatus according to claim 12, wherein the pre-payment authorization code is encrypted.

20. An apparatus according to claim 12, wherein the communication device is a mobile phone of the cardholder.

21. An apparatus according to claim 12, wherein the candidate pre-payment authorization code is encrypted.

22. An apparatus according to claim 12, wherein the data storage device further comprises non-transitory instructions operative by the processor to transmit the candidate pre-payment authorization code via a protocol selected from one of: (i) Short Message Service (SMS), (ii) Unstructured Supplementary Service Data (USSD) and (iii) a software application installed on the communication device of the cardholder.

23. An apparatus according to claim 12, wherein the transaction information further comprising a transaction amount of the order.

24. A non-transitory computer-readable medium, the computer-readable medium having stored thereon program instructions for causing at least one processor to perform operations of:
    (a) obtaining, over a payment network, transaction information in respect of an order placed by a cardholder with a merchant, said transaction information comprising payment account information associated with the cardholder;
    (b) transmitting, over a private communication network, a pre-payment authorization code associated with the order to a first communication device of the cardholder;

(c) receiving, over the private communication network, a payment authorization request from a second communication device of the cardholder, said payment authorization request having been sent upon delivery of ordered merchandise, wherein the payment authorization request comprises a candidate pre-payment authorization code, the pre-payment authorization code authorizing a delay in completion of the POD transaction until delivery of the ordered merchandise;

(d) verifying whether the second communication device is associated with the cardholder and whether the candidate pre-payment authorization code is associated with the pre-payment authorization code;

(e) upon successful verification, transmitting a transaction request over the payment network, to a computing device of an issuing bank associated with a payment account associated with the cardholder to effect electronic payment of funds for the ordered merchandise from the payment account to a computing device associated with an account of a merchant selling the ordered merchandise, the transaction request comprising the payment account information; and (f) upon receiving approval of the transaction request from the computing device of the issuing bank over the payment network, sending, over a second communication network, a confirmation message by the transaction notification component to a mobile computing device of a delivery agent, thereby causing control of the ordered merchandise to be relinquished to the cardholder.

* * * * *